United States Patent [19]

Moulin

[11] Patent Number: 4,787,699

[45] Date of Patent: Nov. 29, 1988

[54] FIBER OPTIC TERMINUS

[75] Inventor: Norbert L. Moulin, Placentia, Calif.

[73] Assignee: Hughes Aircraft Company, Los Angeles, Calif.

[21] Appl. No.: 91,932

[22] Filed: Sep. 1, 1987

[51] Int. Cl.[4] .............................................. G02B 6/38
[52] U.S. Cl. .................................. 350/96.21; 350/96.20
[58] Field of Search ................ 350/96.20, 96.21, 96.22

[56] References Cited

U.S. PATENT DOCUMENTS

| | | | |
|---|---|---|---|
| 4,023,886 | 5/1977 | Nakayama et al. | 350/96.21 |
| 4,362,356 | 12/1982 | Williams et al. | 350/96.21 |
| 4,614,402 | 9/1986 | Caron et al. | 350/96.21 |

FOREIGN PATENT DOCUMENTS

| | | | |
|---|---|---|---|
| 0223609 | 5/1987 | European Pat. Off. | 350/96.21 |
| 2729682 | 1/1979 | Fed. Rep. of Germany | 350/96.21 |

Primary Examiner—William L. Sikes
Assistant Examiner—B. Randolph
Attorney, Agent, or Firm—Joseph E. Szabo; Anthony W. Karambelas

[57] ABSTRACT

A fiber optic terminus (11) comprising a body (13) having a passage (15) therein which opens at an outer surface. The passage (15) can receive an optical fiber (19), and the fiber is guided into position by a fiber guide (17). A temperature-activated adhesive (21) is carried by the body (13), and the adhesive (21) is flowable when its temperature is raised to a predetermined level. A force-applying system, including a plunger (23) and a spring (25), applies a compressive force to the adhesive (21). Accordingly, when the temperature of the adhesive (21) is raised to the predetermined level, the adhesive (21) flows under the influence of the compressive force and adheres the optical fiber (19) in the passage (15).

20 Claims, 1 Drawing Sheet

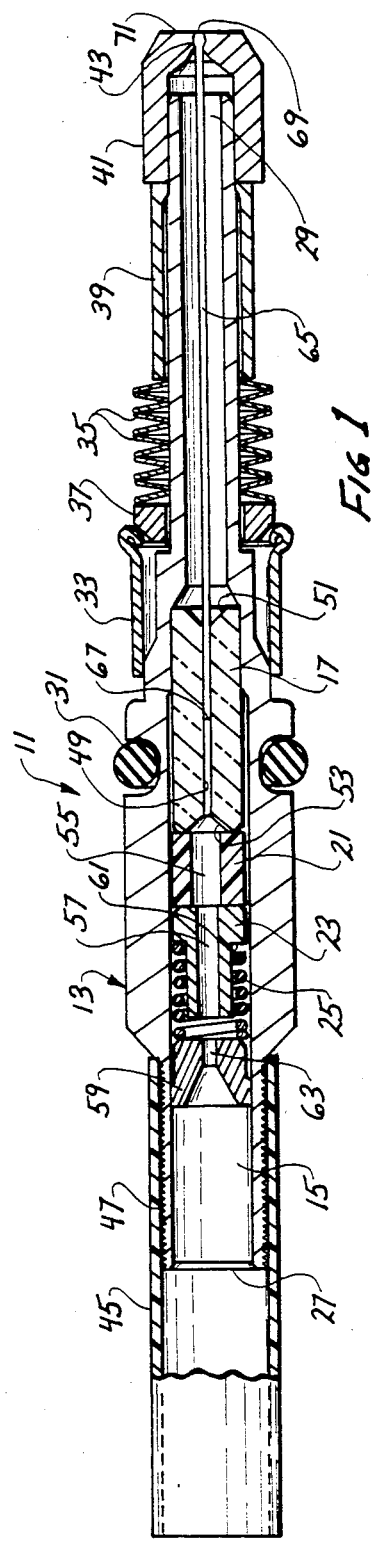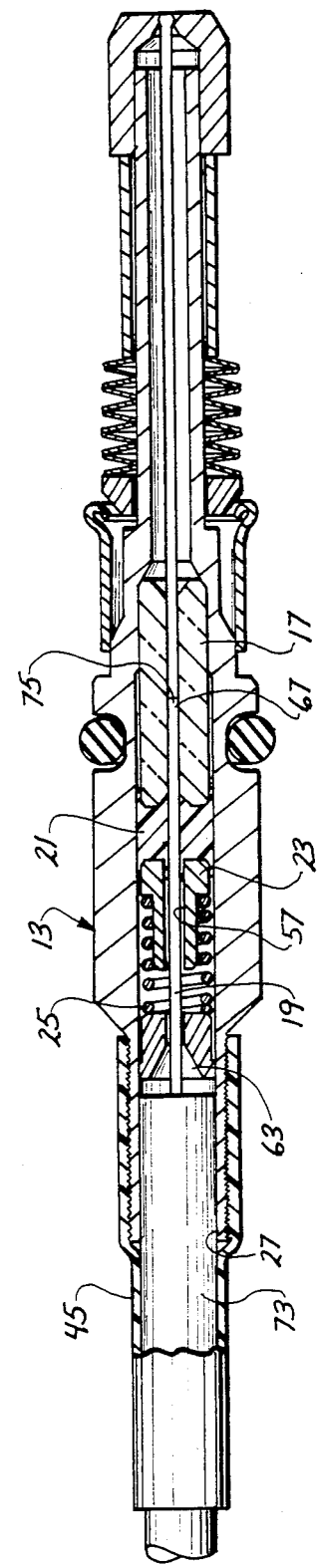

FIBER OPTIC TERMINUS

BACKGROUND OF THE INVENTION

1. Field of the Invention

This invention relates to a fiber optic terminus which facilitates the coupling of optical fibers, both in the field and in the factory.

2. Description of Related Art

In military situations, it is often necessary for personnel operating under field conditions to reterminate optical fibers. In the past, this has been accomplished by injecting an epoxy into the terminus using a hypodermic needle and inserting the optical fiber. When the epoxy cures, the fiber is retained in position within the terminus. The fiber is then cut and polished flush with an outer surface of the terminus.

This technique has a number of disadvantages which are particularly acute for field terminations. For example, mixing of the components of the epoxy is time consuming and somewhat difficult under field conditions. Also, to remove tiny air bubbles known as micro bubbles from the epoxy, it is necessary to apply vacuum to the epoxy. If this is not done, these micro bubbles can induce miniature bends in the optical fiber and cause losses in the optical energy transmitted by the fiber.

Although it does not require substantial skill to carry out the field termination procedure, it would be desirable to further reduce the skill level and the consequent chances of error. It would also be desirable to eliminate the need to cut and polish the fiber in the field. Finally, it would be desirable to eliminate some of the equipment, e.g., the vacuum equipment, polishing tools, epoxy and hypodermic needle, that must be transported into the field or carried aboard ship in order to obtain the fiber optic termination.

SUMMARY OF THE INVENTION

This invention generally overcomes the problems identified above with the prior art. With this invention, the vacuum equipment and hypodermic needle, as well as the mixing of epoxy, are eliminated, and the required skill level is reduced. In addition, the need for polishing the fiber in the field is eliminated.

This invention provides a fiber optic terminus which includes a body having a passage therein and an outer surface. The passage has an opening at the outer surface for receiving an optical fiber. Means is provided in the passage for guiding the optical fiber.

An important feature of this invention is that a temperature-activated adhesive is carried by the body. The adhesive is flowable when its temperature is raised to a predetermined level. By raising the temperature of the temperature-activated adhesive to the predetermined level, the optical fiber can be adhered in the passage of the body.

Because the temperature-activated adhesive is carried by the body, the hypodermic needle employed heretofore and the field mixing of the epoxy are eliminated. In addition, because all that is required is to heat the adhesive to the desired temperature, the skill level for carrying out the coupling of the optical fibers is considerably reduced, and the likelihood of error in obtaining the fiber optic termination is correspondingly reduced.

To solve the problem of the micro bubbles referred to above without the need for separate evacuation equipment, this invention provides means for applying a compressive force to the adhesive. When the temperature of the adhesive is raised to the predetermined level, the adhesive flows under the influence of the force applying means, and the micro bubbles are forced out of the adhesive.

The adhesive can be of any temperature-activated type which is capable of adhering an optical fiber in the passage of the body. For example, the adhesive may be hot melt glue, a B-staged epoxy pellet or wax. Preferably, the adhesive is solid at ambient temperatures and becomes flowable at a temperature well above ambient, such as 300 degrees F. or above. For better adhesion, the adhesive preferably completely surrounds the optical fiber, and for this purpose, has a passage extending through it which is adapted to receive the optical fiber.

Although the force-applying means can take different forms, it preferably includes a tubular plunger having a passage extending therethrough which is also adapted to receive the optical fiber. Although the plunger can be moved in different ways, this can be simply, accurately and inexpensively accomplished using biasing means, such as a spring.

The means for guiding the optical fiber can take various different forms, but preferably it includes a fiber guide in the passage of the body and having a passage extending through it. With this construction, the passages of the fiber guide, the adhesive and the plunger are preferably all in registry so that the optical fiber can be extended through all of them. Also, the adhesive is preferably sandwiched between the fiber guide and the plunger so that the adhesive is compressively loaded between the plunger and the fiber guide.

Another feature of this invention, which can be used with or without the temperature-activated adhesive feature, is that the fiber optic terminus may be provided with one optical fiber permanently retained in the passage of the body with an outer end face of the optical fiber polished and essentially flush with an outer surface of the terminus. This eliminates cutting and polishing of the fiber in the field. An inner end face of the optical fiber is exposed in the passage of the fiber guide. When so constructed, the fiber optic terminus is adapted to optically couple the inner end face and the optical fiber which is receivable through the opening. In addition, the adhesive can be activated in the factory or elsewhere to attach the optical fiber.

The invention, together with additional features and advantages thereof, may best be understood by reference to the following description taken in connection with the accompanying illustrative drawing.

BRIEF DESCRIPTION OF THE DRAWING

In the accompanying drawings:

FIG. 1 is an axial sectional view through a fiber optic terminus constructed in accordance with the teachings of this invention with the adhesive in a deactivated state.

FIG. 2 is a sectional view similar to FIG. 1 with the adhesive activated and cured.

DESCRIPTION OF THE PREFERRED EMBODIMENT

FIG. 1 shows a fiber optic terminus 11 which includes a body 13 having an axial passage 15 extending therethrough, means, including a fiber guide 17 in the passage 15 for guiding an optical fiber 19 (FIG. 2), a temperature-activated adhesive 21 and means for applying a compressive force to the adhesive in the form of a plunger 23 and a spring 25.

The body 13 can be of any desired configuration, and in this embodiment, the body 13 is elongated and is constructed of a suitable metal. The passage 15 has openings 27 and 29 at its opposite ends.

A number of accessories may be mounted on the body 13 to form a body assembly for various purposes, such as mounting of the body into a housing (not shown). These accessories are conventional and may include, for example, an O-ring seal 31, a contact retention clip 33, a series of belleville washers 35 mounted to form a spring and acting against a washer 37, a floating spacer 39 and a guide bushing 41 pressed onto one end of the body 13 and having a orifice 43. A length of heat-shrink tubing 45 is slid over the other end of the body 13, and such other end may have a series of grooves 47 in its outer surface to strengthen the attachment between the tubing 45 and the body 13 when the former is shrunk onto the body.

The fiber guide 17 is suitably fixedly mounted within the passage 15 and, in the illustrated embodiment, is pressed into a region of the passage 15. The fiber guide 17 has an axial passage 49 extending completely through it. The passage has flared conical end portions 51 and 53. The fiber guide 17 is preferably constructed of a ceramic.

The adhesive 21 is carried by the body 13 and must be able to flow into the passage 15 when activated. Preferably, the adhesive 21 is retained within the passage 15 and, in this embodiment, is sandwiched between and engages the plunger 23 and the fiber guide 17. In this embodiment, the adhesive 21 is a hot-melt glue which becomes flowable at about 300 degrees F. and is in the form of a cylindrical ring having a cylindrical passage 55 extending axially through it.

The plunger 23 has an axial cylindrical passage 57 extending completely through it. The plunger 23 is slidable axially in the passage 15 of the body 13 and is biased toward the adhesive 21 by the spring 25, which acts between a rear fiber guide 59 and an annular shoulder 61 on the plunger 23. For example, the spring 25 may apply a load of about 100 psi to the adhesive 21.

The rear fiber guide 59 is mounted in the passage 15 and, in this embodiment, is pressed into the passage 15. The rear fiber guide 59 has an axial passage 63 extending through it with the lefthand or entrance end of the passage flared conically outwardly. The passages 49, 55, 57 and 63 are all in registry and, in this embodiment, are in axial alignment so they can receive the optical fiber 19 as described hereinbelow.

In this embodiment, an optical fiber 65 comprising a core and cladding extends through the orifice 43 and into the passage 49 of the fiber guide 17. The optical fiber 65 may be attached in any suitable manner, and in this embodiment, it is bonded to the guide bushing 41 at the orifice 43. The optical fiber 65 terminates in an inner end face 67 in the passage 49 of the fiber guide 17 and in an outer end face 69, which is ground and polished flush with an end surface 71 of the body assembly and, more specifically, the guide bushing 41. This can be done during manufacture to eliminate field polishing of the outer end face 69. The radial position of the inner end face 67 is accurately controlled by the passage 49 of the fiber guide 17. A layer of index matching material may be applied to the inner end face 67. Of course, an optical component other than the end face 67 of the optical fiber 65 may be retained by the fiber guide for purposes of being optically coupled to the optical fiber 19.

In use of the fiber optic terminus 11, a region of a jacket 73 (FIG. 2) is stripped away to expose the optical fiber 19 which comprises a core and cladding. The optical fiber 19 is then inserted through the opening 27 and the passages 63, 57 and 55 and into the passage 49 of the fiber guide. The optical fiber 19 is advanced until its end face 75 engages the end face 67 of the optical fiber 65 as shown in FIG. 2. In this position, the end faces 67 and 75 are accurately aligned, and the jacket 73 is within the lefthand end portion of the passage 15 and within the tubing 45.

With the optical fiber 19 in this position, the body 13 and the tubing 45 may be heated in any suitable manner, such as by a small forced air heater to elevate the temperature of the adhesive to the level at which the adhesive becomes flowable. When the adhesive becomes flowable, it is forced to flow by the force of the spring 25 acting on the plunger 23 to reduce the axial length of the adhesive and to cause it to flow radially in both directions such that it engages the wall of the passage 15 of the body 13 and completely surrounds and tightly engages the optical fiber 19 as shown in FIG. 2. The adhesive can be expected to flow into the enlarged end portion 53 of the passage 49 and into any openings presented. Of course, the adhesive remains quite viscous even when flowable. The adhesive is then allowed to cure to strongly couple the optical fiber 19 to the body 13 with the end faces 67 and 75 coaxial and in contact, or essentially in contact.

The temperature to which the fiber optic terminus 11 is exposed is preferably sufficient to activate the shrink tubing 45 to cause it to contract around the body 13 and the jacket 73 as shown in FIG. 2. However, it could be activated at a higher temperature, if desired. Th shrink tubing 45 holds the jacket 73 in the position shown in FIG. 2.

Although exemplary embodiments of the invention have been shown and described, many changes, modifications and substitutions may be made by one having ordinary skill in the art without necessarily departing from the spirit and scope of this invention.

What is claimed is:

1. A fiber optic terminus comprising:
   a body having a passage therein and an outer surface, said passage having an opening at said outer surface for receiving an optical fiber;
   means in said passage for guiding the optical fiber;
   a temperature-activated adhesive carried by said body, said adhesive being flowable when its temperature is raised to a predetermined level; and
   means for applying a compressive force to said adhesive whereby when the temperature of the adhesive is raised to said predetermined level the adhesive flows under the influence of said applying means to adhere the optical fiber in the passage.

2. A fiber optic terminus as defined in claim 1 wherein said adhesive has a passage extending through it which is adapted to receive the optical fiber.

3. A fiber optic terminus as defined in claim 1 wherein said applying means includes a tubular plunger having a passage extending therethrough which is adapted to receive the optical fiber.

4. A fiber optic terminus as defined in claim 3 wherein said adhesive has a passage extending through it which is adapted to receive the optical fiber and said passages of the adhesive and the plunger are in registry.

5. A fiber optic terminus as defined in claim 3 wherein the force applying means includes biasing means for biasing the plunger toward the adhesive.

6. A fiber optic terminus as defined in claim 4 wherein the force applying means includes biasing means for biasing the plunger toward the adhesive.

7. A fiber optic terminus as defined in claim 1 wherein the adhesive is hot melt glue.

8. A fiber optic terminus as defined in claim 1 wherein said predetermined temperature is above about 300 degrees F.

9. A fiber optic terminus as defined in claim 1 wherein an optical fiber having an end face is retained in said passage and said guiding means is adapted to guide the optical fiber receivable through said opening into registry with said face.

10. A fiber optic terminus as defined in claim 9 wherein said guiding means includes a fiber guide in the passage of the body and having a passage extending therethrough, said end face being in said passage of said fiber guide and said passage of said fiber guide being adapted to receive the optical fiber which is receivable through said opening.

11. A fiber optic terminus as defined in claim 9 wherein said adhesive has a passage extending through it which is adapted to receive the optical fiber which is receivable through said opening.

12. A fiber optic terminus as defined in claim 9 wherein said applying means includes a tubular plunger having a passage extending therethrough which is adapted to receive the optical fiber which is receivable through said opening.

13. A fiber optic terminus as defined in claim 12 wherein said adhesive has a passage extending through it which is adapted to receive the optical fiber which is receivable through said opening and wherein the passages of the adhesive and the plunger are in registry.

14. A fiber optic terminus as defined in claim 12 wherein the force applying means includes biasing means for biasing the plunger toward the adhesive.

15. A fiber optic terminus as defined in claim 13 wherein the force applying means includes biasing means for biasing the plunger toward the adhesive.

16. A fiber optic terminus comprising:
a body having a passage therein and an outer surface, said passage having an opening at said outer surface for receiving an optical fiber;
a fiber guide mounted in said passage, said fiber guide having a passage therein;
a temperature-activated adhesive in said passage of said body, said adhesive being flowable when its temperature is raised to a predetermined level, said adhesive having a passage extending therethrough;
a tubular plunger in said passage of said body, said tubular plunger having a passage extending therethrough;
said adhesive being between said fiber guide and said plunger and said passages of said fiber guide, said adhesive and said plunger being in registry and adapted to receive the optical fiber; and
biasing means for urging the plunger toward the adhesive to compressively load the adhesive between the plunger and the fiber guide.

17. A fiber optic terminus as defined in claim 16 wherein said passage of said body extends completely through said body, said fiber optic terminus including an optical fiber having an end face retained in said passage of said fiber guide, whereby the fiber guide is adapted to guide the optical fiber receivable through said opening into registry with said end face.

18. A fiber optic terminus comprising:
a body having a passage therein and an outer surface, said passage having an opening at said outer surface;
a first optical fiber extending through said opening into said passage of said body;
means in said passage of said body for guiding the optical fiber;
a temperature-activated adhesive in said passage of said body and surrounding said optical fiber, said adhesive having been temperature activated and cured, said adhesive adhering the optical fiber in said passage of said body; and
means for applying a compressive force to said adhesive.

19. A fiber optic terminus as defined in claim 18 including a second optical fiber having an end face retained in said passage of said body in registry with said first optical fiber.

20. A fiber optic terminus comprising:
a body assembly having a passage extending therethrough and an outer surface, said passage having first and second openings at spaced locations on said outer surface;
a first optical fiber extending through said first opening into said passage of said body, said optical fiber having an inner end face in said passage and a polished outer end face substantially flush with said outer surface;
means for retaining the first optical fiber in said passage of said body;
said passage being adapted to receive a second optical fiber through said second opening;
means in said passage of said body for guiding the second optical fiber into registry with said inner end face of the first optical fiber; and
the guiding means including a fiber in the passage of the body and a fiber guide having a passage for receiving portions of the first and second optical fibers.

* * * * *